United States Patent
DiMarcello et al.

[11] Patent Number: 5,698,124
[45] Date of Patent: Dec. 16, 1997

[54] MAGNESIA FIBER DRAW FURNACE

[75] Inventors: Frank Vincent DiMarcello, Annandale; James William Fleming, Jr., Westfield; Arthur Clifford Hart, Jr., Chester; Richard Garner Huff, Basking Ridge; Karen S. Kranz, Middlesex, all of N.J.

[73] Assignee: Lucent Technologies Inc., Murray Hill, N.J.

[21] Appl. No.: 551,240

[22] Filed: Oct. 31, 1995

Related U.S. Application Data

[63] Continuation of Ser. No. 443,510, May 18, 1995, abandoned.

[51] Int. Cl.$^6$ .................. H05B 6/10; F27D 1/00
[52] U.S. Cl. ............. 219/635; 219/636; 373/137
[58] Field of Search .................. 219/634, 635, 219/636, 637; 373/130, 137, 155, 110, 111, 119, 127, 162-164; 65/12; 266/280

[56] References Cited

U.S. PATENT DOCUMENTS

| | | | |
|---|---|---|---|
| 4,450,333 | 5/1984 | Andrejco et al. | 219/634 |
| 4,547,644 | 10/1985 | Bair et al. | 219/634 |
| 4,608,473 | 8/1986 | Paek et al. | 219/634 |
| 5,308,947 | 5/1994 | Fleming, Jr. | 219/634 |
| 5,410,567 | 4/1995 | Brundage et al. | 373/137 |

OTHER PUBLICATIONS

R.B. Runk, "A Zirconia Induction Furnace For Drawing Precision Silica Waveguides", *Optical Fiber Transmission II Technical Digest* (TuB5-1)(Feb. 22-24, 1977).

*Primary Examiner*—Tu B. Hoang
*Attorney, Agent, or Firm*—Glen E. Books

[57] ABSTRACT

A fiber drawing apparatus is provided with an improved fiber draw furnace wherein an inner zirconia tube is surrounded by a radially-spaced annular insulating region of magnesia within a silica beaker. While the magnesia has a melting point approximately the same as zirconia, the electrical conductivity of magnesia is substantially lower, enabling it to withstand higher RF power. Moreover magnesia is more soluble than zirconia in silica, reducing the likelihood of particulate contamination of the fiber.

7 Claims, 3 Drawing Sheets

MAGNESIA FIBER DRAW FURNACE

CROSS-REFERENCE TO RELATED APPLICATION

This application is a continuation of application Ser. No. 08/443,510, filed on May 18, 1995, now abandoned.

FIELD OF THE INVENTION

This invention relates to apparatus for drawing optical fiber from a glass proform and, in particular, to fiber drawing apparatus using an improved induction heating furnace.

BACKGROUND OF THE INVENTION

The development of low loss, fused silica optical fiber has led to the investigation of high temperature (e.g., approximately 2000° C.) heat sources for drawing high strength fiber from a glass proform. Of the possible heat sources, oxy-hydrogen torches, $CO_2$ lasers, induction furnaces and resistance furnaces have been commonly employed for drawing high silica fibers. The torch method, while inexpensive, cannot maintain a uniform diameter over long lengths of fiber. The $CO_2$ laser provides the cleanest drawing atmosphere, but the laser requires special optical designs to radially distribute the energy for drawing and is limited in power. Induction furnaces are among the most useful high temperature sources.

An induction furnace for drawing silica fibers is described in R. B. Runk "A Zirconia Induction Furnace for Drawing Precision Silica Waveguides", *Optical Fiber Transmission II Technical Digest* (TuB5-1) (Feb. 22–24, 1977). Typically, a fiber induction furnace uses a tubular zirconia susceptor disposed within a radio frequency coil ("RF Coil"). After the zirconia susceptor is heated to a desired temperature of approximately 2100° C., a glass preform rod is introduced into the middle of the susceptor, known as the hot zone. A portion of the proform is reflowed, and optical fiber is drawn from the reflowed portion.

Conventional zirconia fiber draw furnaces comprise an outer cylindrical beaker of fused quartz, an inner tube of zirconia and an insulating region therebetween filled with zirconia granules. A radial pyrometer sight tube is provided through the furnace to permit examination of an axial region of the susceptor.

Although these conventional furnaces have produced fibers for many years, there have been a number of problems. From time to time zirconia particles from the insulating region contaminate the fiber and cause failures. Also the pyrometer site tube, which passes through the zirconia insulating granules, has a tendency to sag with time, causing erroneous temperature readings and premature furnace failure.

Recent trends toward the use of larger preforms, increasing draw speeds and higher furnace temperatures reveal further weaknesses in the conventional furnace design. There have been a number of incidents in which the zirconia insulating grain sinters together and melts to form a donut shaped mass completely surrounding the hottest part of the zirconia tube. Once the zirconia granules begin to melt, the RF field couples into the melted mass causing further sintering and melting. This phenomenon increases the power load on the system and eventually causes furnace failure. Accordingly, there is a need for a new furnace design with enhanced stability at high temperature operation.

SUMMARY OF THE INVENTION

In accordance with the present invention, fiber drawing apparatus is provided with an improved fiber draw furnace wherein an inner zirconia tube is surrounded by a radially-spaced annular insulating region of magnesia within a silica beaker. While the magnesia has a melting point approximately the same as zirconia, the electrical conductivity of magnesia is substantially lower, enabling it to withstand higher RF power. Moreover magnesia is more soluble than zirconia in silica, reducing the likelihood of particulate contamination of the fiber.

BRIEF DESCRIPTION OF THE DRAWING

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
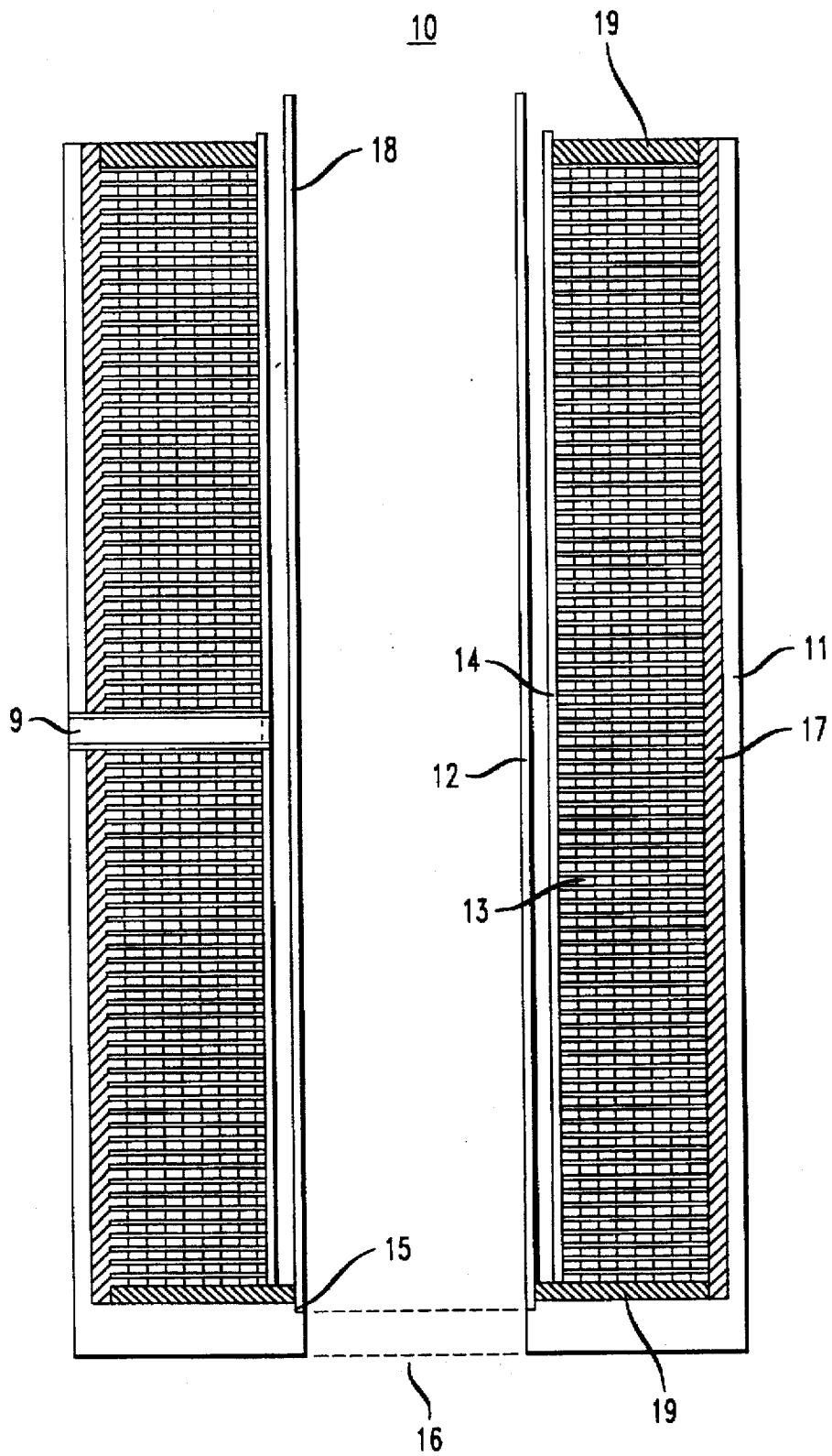
FIG. 1 is a cross-sectional view of the core of an induction furnace.

Referring to the drawings, FIG. 1, is a cross-sectional view of the core 10 of a furnace comprising an outer silica beaker 11, an inner zirconia susceptor tube 12 and, disposed between the beaker and the tube, an insulating layer 13 of magnesia (MgO) refractory grog ("grain"). The magnesia grog can be advantageously bounded by a dense magnesia tube 14 for holding the grog in place. A site tube 9 is advantageously provided to permit optical access to the center of the core.

The beaker 11 is preferably an open-top silica vessel having a sidewall and a bottom surface 15 with a central aperture 16. The sidewall, which is preferably flame-sealed to the bottom surface, is advantageously insulated with a layer 17 of aluminosilicate insulation.

The zirconia susceptor tube 12 is disposed radially within the insulating layer 13 and is preferably located centrally within the beaker 11. The susceptor is preferably spaced from the magnesia insulator (e.g. tube 14) in order to avoid unwanted chemical reactions at high temperature. The interior surface 18 of the susceptor provides the furnace bore.

It is advantageous to provide annular, refractory felt discs 19 at the top and bottom of the silica beaker to prevent the movement of particles of refractory grain into the interior of the susceptor 12 where the particles could contaminate the preform or fiber. Suitable refractory felt discs are described in U.S. Pat. No. 4,547,644 issued to Bair et al on Oct. 15, 1985 which is incorporated herein by reference.

In a typical embodiment the silica beaker is a cylindrical beaker 6 inches in diameter, and 12 inches in length. The zirconia susceptor tube 12 is yttria-stabilized zirconia manufactured by Stanelco Products Limited. The susceptor can be a cylindrical tube approximately 3 inches in diameter and is preferably slightly longer than the beaker. The insulating magnesia grog 13 is Mag Chem P-98 Magnesia manufactured by Martin-Marietta Magnesia Specialties, Inc., and the dense magnesia tube 14 is a 3 mm thick tube of high density magnesia manufactured by Ozark Technical Ceramics, Inc.

Figure 2:
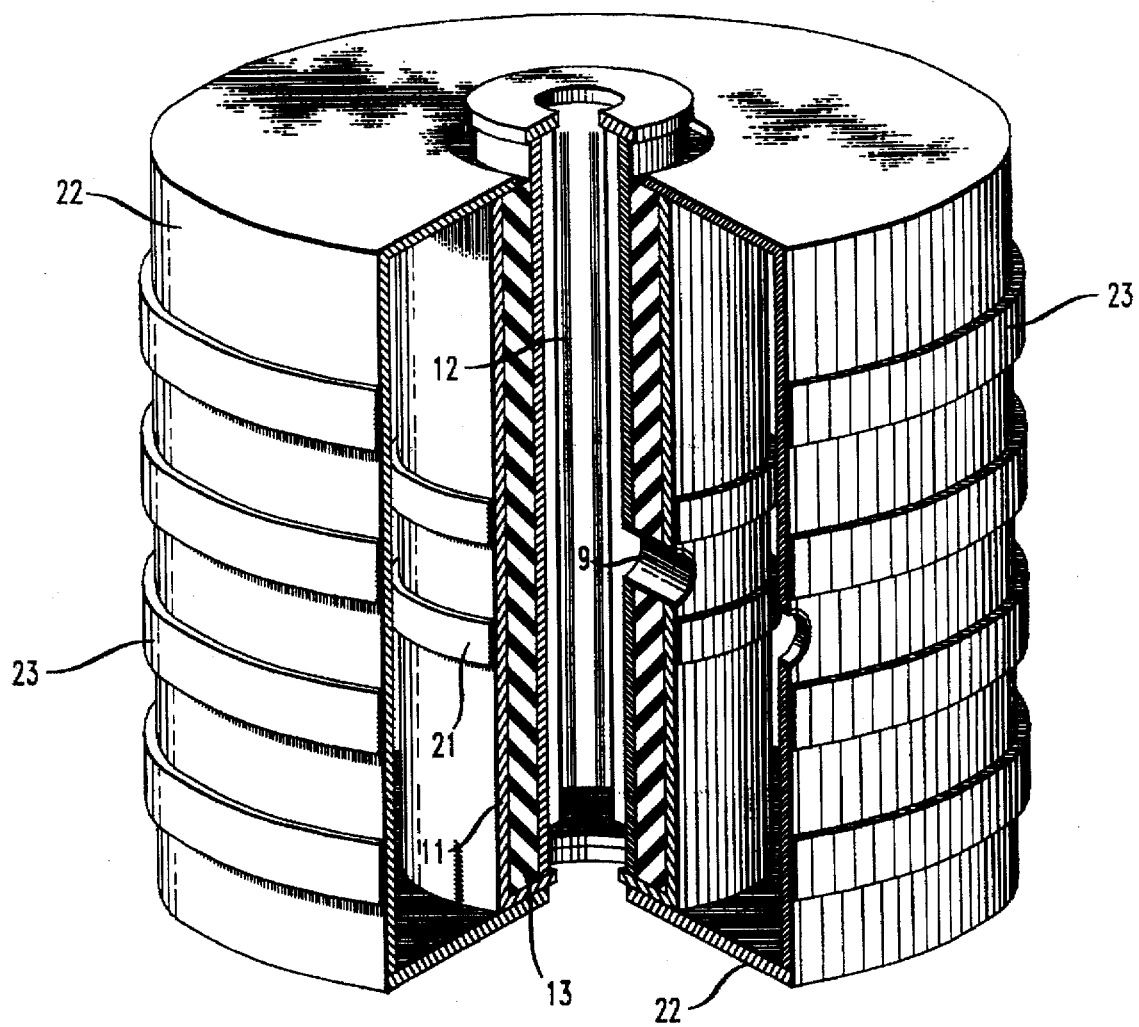
FIG. 2 is a vertical section of an induction furnace employing the core of FIG. 1.

FIG. 2 shows an induction furnace 20 employing the core of FIG. 1. The furnace 20 comprises the silica beaker 11 (and its contents) disposed within an RF induction coil 21. Both the beaker and the coil are surrounded by a metal housing 22 such as a cylindrical copper shell. The housing acts as a shield to reduce stray radio-frequency radiation from the coil 21 and preferably includes a coolant coil 23 for circulation of a coolant such as water. In typical practice, a 4–8 turn induction coil and a 3–5 MHz radio-frequency power supply are efficient for coupling the susceptor.

The advantages of this fiber draw furnace are manifold. The magnesia has substantially lower electrical conductivity than zirconia, permitting magnesia to withstand the use of higher RF power. Moreover, magnesia is more soluble than zirconia in silica, reducing the likelihood of particulate contamination of the fiber. In addition, a magnesia tube used to separate the magnesia insulating grain from the zirconia susceptor provides a suitable inner support for the pyrometer site tube. Further, the lower weight and cost of this design over the previous one provides distinct advantages as furnaces become larger to accommodate state of the art preforms. Since magnesium oxide has approximately one-half the bulk density of zirconium dioxide, the furnace is considerably lighter and easier to handle in the manufacturing environment. Also, because magnesium oxide grain is manufactured in large quantity for use in chemical processes and refractories, it is substantially less expensive than the specially prepared zirconia presently used. Additionally, the design of this furnace allows the removal and replacement of the zirconia susceptor without moving the silica beaker from the draw tower—a considerable time saving in a manufacturing environment.

Figure 3:
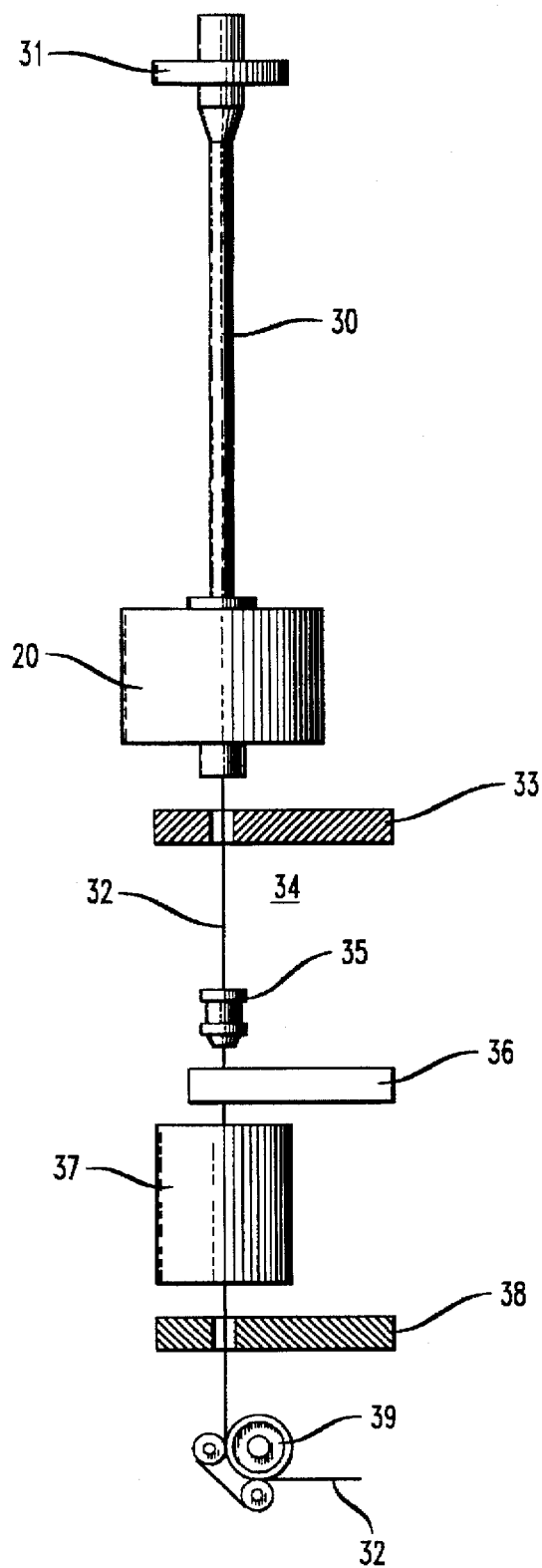
FIG. 3 is a schematic view of a fiber drawing apparatus using the induction furnace of FIG. 2.

FIG. 3 schematically illustrates fiber drawing apparatus using the improved furnace of FIGS. 1 and 2. In essence the furnace 20 is mounted for receiving a glass preform 30 from a conventional preform feed mechanism 31. The preform is fed into the furnace bore, and an optical fiber 32 is drawn from the heated end of the preform. The drawn fiber, in turn, is moved through a diameter monitor 33, and a cooling region 34. The partially cooled fiber passes through a coating applicator 35 wherein it is provided with a protective polymeric coating. The coating is monitored for concentricity by monitor 36, and the coated fiber is cured in curing station 37, checked for cured diameter at monitor 38 and passes through a capstan 39 to a take-up reel (not shown).

The invention claimed is:

1. A furnace for heating a glass rod comprising:
   a zirconia susceptor tube having an interior region for receiving said glass rod;
   a cylindrical silica beaker circumscribing said zirconia susceptor tube; and
   between said susceptor tube and said beaker an insulating region comprising magnesia grog.

2. A furnace according to claim 1 further comprising a magnesia tube disposed between said magnesia grog and said susceptor tube for holding said grog in place.

3. A furnace according to claim 2 wherein said magnesia tube is spaced from said susceptor tube.

4. A furnace according to claim 1 further comprising a layer of aluminosilicate insulator disposed between said beaker and said magnesia grog.

5. A furnace according to claim 1 further comprising an RF induction coil for heating said furnace.

6. A furnace according to claim 5 further comprising a metal shell substantially surrounding said RF induction coil for reducing radiation from said coil away from said furnace.

7. Apparatus for drawing glass fiber comprising:
   a preform feed mechanism for feeding a glass preform into a furnace;
   apparatus for drawing optical fiber from said furnace; and
   wherein said furnace has a furnace bore for receiving said preform and heating at least a portion of the preform to reflow temperature; said furnace comprising a zirconia susceptor tube, a cylindrical silica beaker circumscribing said susceptor, and between said susceptor and said beaker, an insulating region comprising magnesia grog.

* * * * *